United States Patent [19]
Watrous

[11] Patent Number: 5,148,340
[45] Date of Patent: Sep. 15, 1992

[54] BIFURCATED AIR BEARING ACTUATOR ASSEMBLY FOR A DISK DRIVE SYSTEM

[75] Inventor: Robert B. Watrous, San Jose, Calif.

[73] Assignee: International Business Machines Corporation, Armonk, N.Y.

[21] Appl. No.: 510,484

[22] Filed: Apr. 18, 1990

[51] Int. Cl.$^5$ .................. G11B 5/55; G11B 21/08; G11B 5/54
[52] U.S. Cl. ................................ 360/106; 360/105
[58] Field of Search ............ 360/106, 105, 104, 103, 360/102, 98.01, 97.01

[56] References Cited

U.S. PATENT DOCUMENTS

| | | | |
|---|---|---|---|
| 3,482,232 | 12/1969 | Farrand et al. | 340/174.01 |
| 4,166,284 | 8/1979 | Daniels | 360/106 |
| 4,322,762 | 3/1982 | Manzke et al. | 360/106 |
| 4,393,425 | 7/1983 | Wright | 360/105 |
| 4,396,966 | 8/1983 | Scranton et al. | 360/106 |
| 4,414,594 | 11/1983 | Farmer et al. | 360/106 |
| 4,450,493 | 5/1984 | Watrous | 360/106 |
| 4,506,307 | 3/1985 | Watrous | 360/106 |
| 4,531,169 | 7/1985 | Daniels | 360/97 |
| 4,533,186 | 8/1985 | Engwall et al. | 308/5 R |
| 4,545,625 | 10/1985 | Engwall | 308/5 R |
| 4,587,714 | 5/1986 | Morris | 29/594 |
| 4,620,253 | 10/1986 | Garwin et al. | 360/106 |
| 4,743,987 | 5/1988 | Farmer et al. | 360/106 |

FOREIGN PATENT DOCUMENTS 0118278 2/1983 European Pat. Off. .
61-59669 3/1986 Japan .
8402755 7/1984 PCT Int'l Appl. .

OTHER PUBLICATIONS

IBM TDB, vol. 24, No. 3, Aug. 1981, pp. 1477–1478, J. Moffitt, et al., "Self-Pressurized air Bearings For Disk File Actuators".
IBM TDB, vol. 24 No. 10, Mar. 1982, p. 4913, J. Nayak "Hollow Arm, Low Inertia Actuator With Damper and Self-Sustained Air-Bearing".
IBM TDB, vol. 28 No. 5, Oct. 1985, pp. 1889–1890, J. Cocke, et al., "Composite Center Core For Reduction of Stray Magnetic Fields In Disk File Actuators".

Primary Examiner—John H. Wolff
Assistant Examiner—Craig A. Renner
Attorney, Agent, or Firm—Douglas R. Millett

[57] ABSTRACT

An actuator comprises a slotted stator which is mounted in a stator frame. The stator is connected to the frame by an attachment which allows the stator to move rotationally, axially and laterally relative to the frame without distorting the dimensions of the stator. The stator has an air bearing outer surface which receives a slider. A head arm assembly is attached to the slider such that the head arm assembly may be completely positioned within the stator slot when the slider is fully retracted.

27 Claims, 4 Drawing Sheets

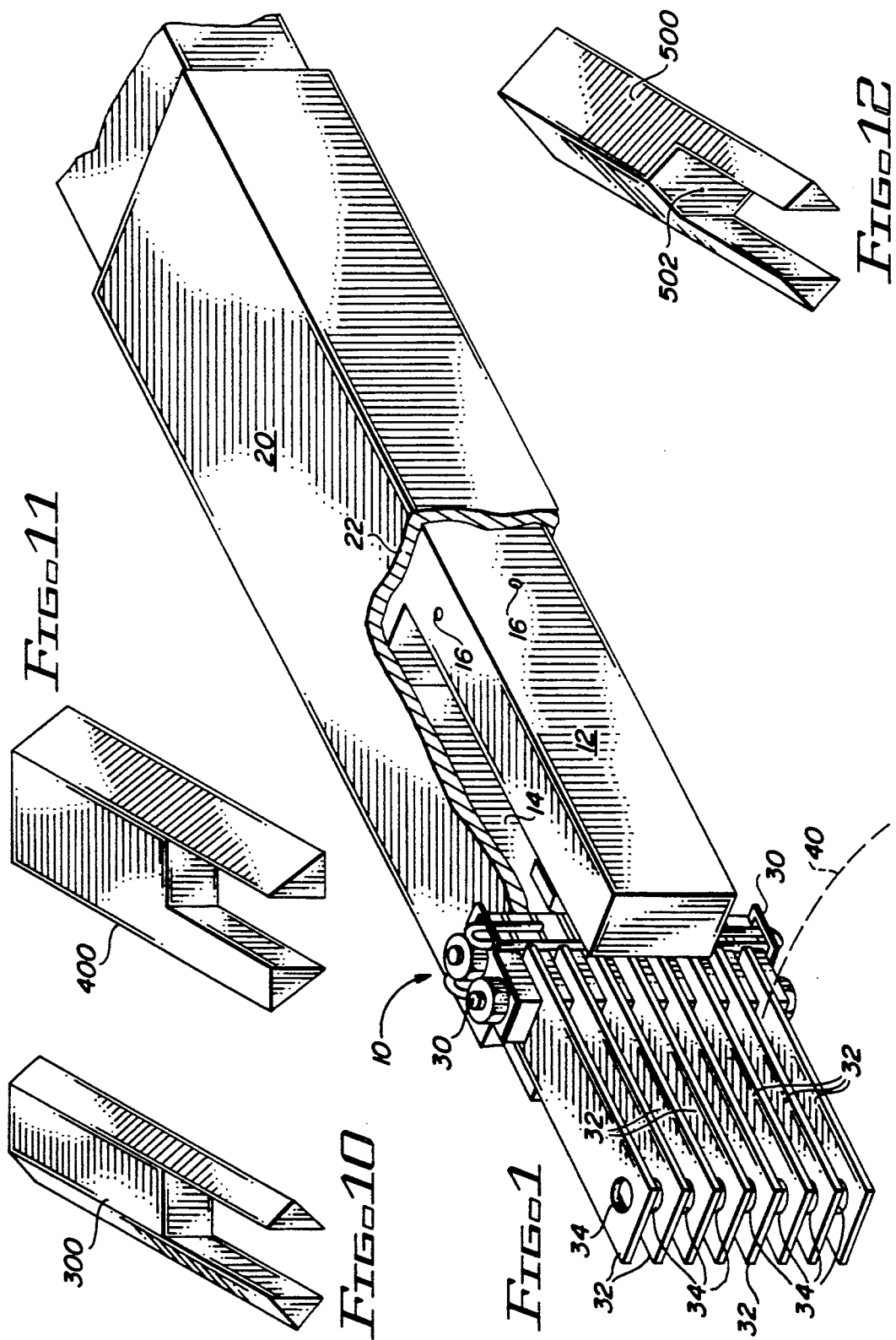

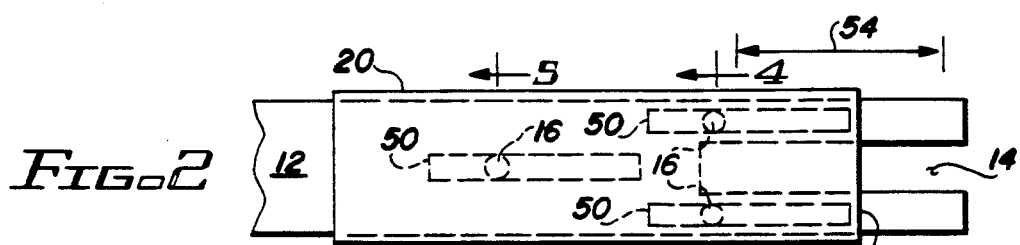
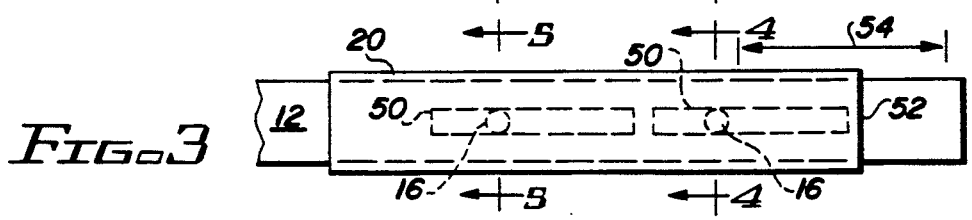
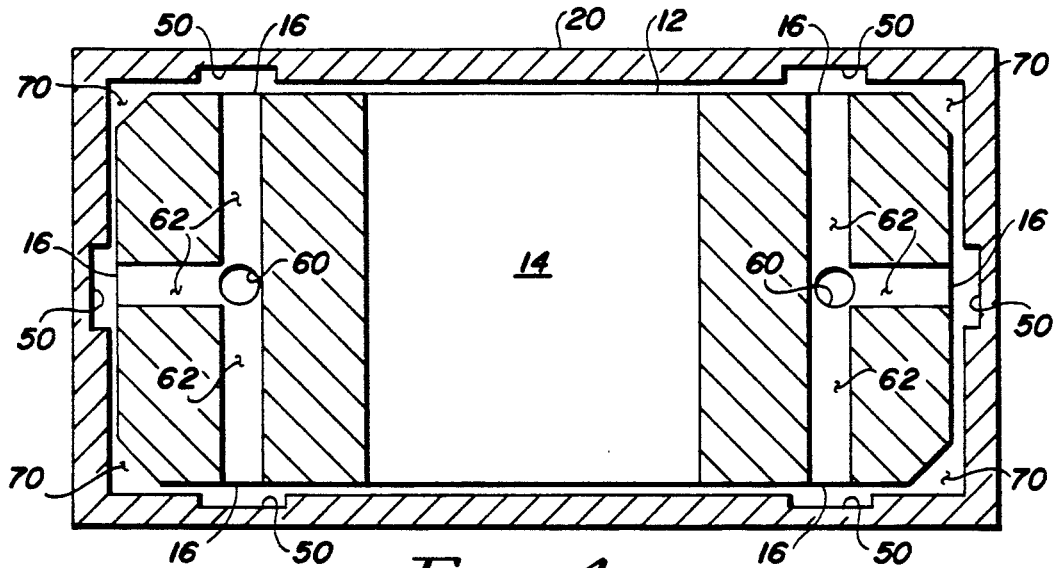
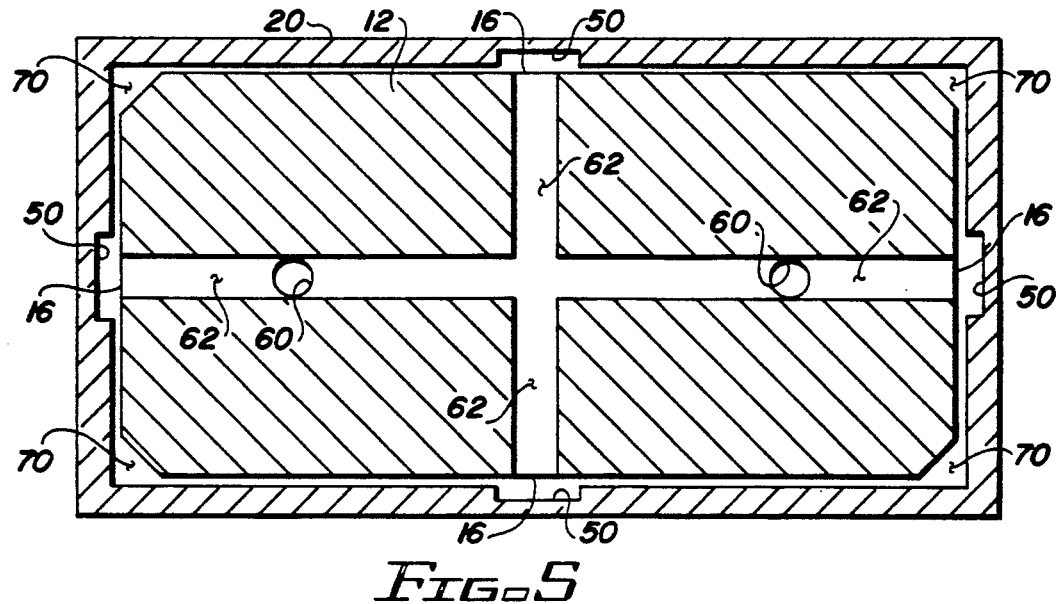

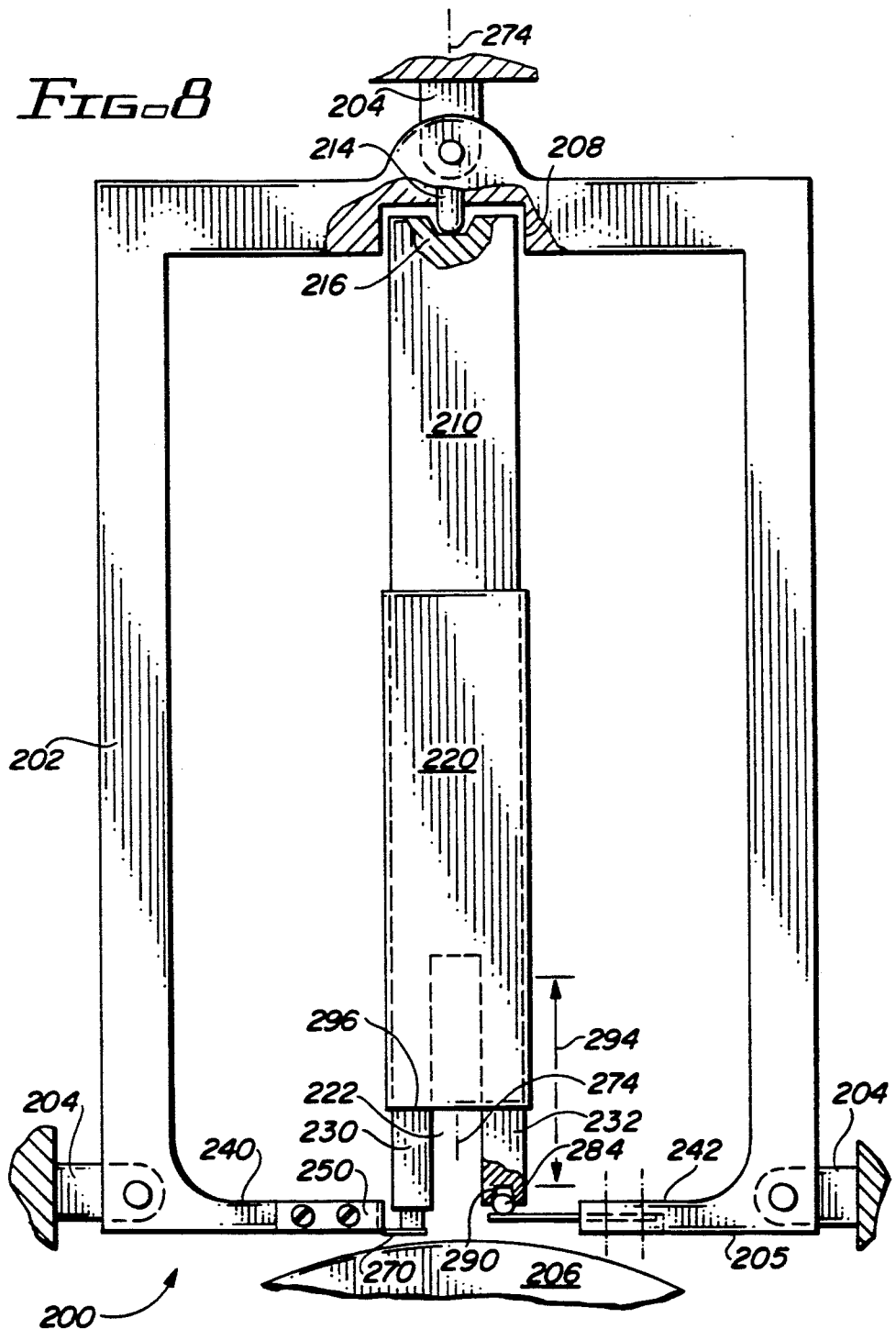
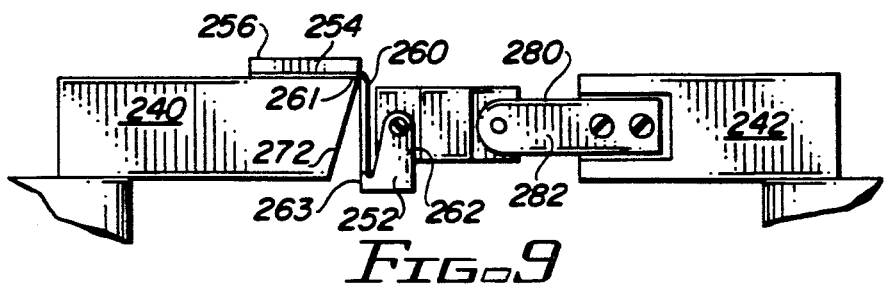

1

BIFURCATED AIR BEARING ACTUATOR ASSEMBLY FOR A DISK DRIVE SYSTEM

TECHNICAL DESCRIPTION

This invention relates to a bearing for an actuator in a disk drive system and relates more particularly to an air bearing actuator having a compact arrangement.

BACKGROUND OF THE INVENTION

In disk drive data storage systems it is necessary to position the transducer or head accurately over the disk by means of an actuator mechanism. These actuators must be able to achieve high precision movements, but at the same time be very compact in size.

Ball bearing assemblies have been used in linear actuators in disk drive systems. These ball bearing assemblies tend to have a relatively large number of parts which must be carefully assembled. Even with good assembly, the ball bearings themselves often have imperfections which add vibration to the actuator.

Another problem with ball bearings is that they tend to contribute contaminants to the disk drive environment. As the bearings are used, small particles are worn away. Even these small particles can interfere with the reading and writing of the disk. Lubricants from the bearings also add to the contamination.

Air bearings have also been tried in actuator systems. The air bearings are practically frictionless and contribute very little contaminants. However, air bearing actuators have tended to be rather bulky. Also, the air bearing actuators of the prior art have been hard to assemble because of the very high tolerance requirements.

What is needed is a compact air bearing actuator with few parts which is easy to assemble.

SUMMARY OF THE INVENTION

Towards this end and according to the invention, an actuator comprises a slotted stator which is mounted in a stator frame. The slotted end of the stator is positioned just beyond the outer diameter edge of the disk drive stack. The stator is connected to the frame by attachment means which allow the stator to be rotationally, axially and laterally displaced from the frame without distorting the critical dimensions of the stator.

An air bearing slider or sleeve is mounted over and slides along the stator. The stator has air passages which deliver pressurized air to the space between the slider and the stator to create the air bearing. Chambers in the inner surface of the slider provide for uniform distribution of the air. A transducer arm assembly is attached to the slider such that it is positioned within the stator slot when the slider is fully retracted.

For a fuller understanding of the nature and advantages of the present invention reference should be made to the following detailed description taken in conjunction with the accompanying drawings.

BRIEF DESCRIPTION OF THE DRAWINGS

FIG. 1 is a perspective view of a portion of the actuator of the present invention;

FIG. 2 is a top view of the stator and slider of the present invention;

FIG. 3 is a side view of the stator and slider of the present invention;

FIG. 4 is a cross-sectional view of the stator and slider taken along line 4—4 of FIGS. 2 and 3;

FIG. 5 is a cross-sectional view of the stator and slider taken along lines 5—5 of FIGS. 2 and 3;

FIG. 8 is a top view of a second embodiment of the actuator of the present invention;

FIG. 9 is an end view of the actuator of FIG. 8;

FIG. 10 is a perspective view of an alternative stator of the present invention;

FIG. 11 is a perspective view of an alternative embodiment of the stator of the present invention; and FIG. 12 is a perspective view of an alternative embodiment of the stator of the present invention.

DESCRIPTION OF THE PREFERRED EMBODIMENTS

Figure 6:
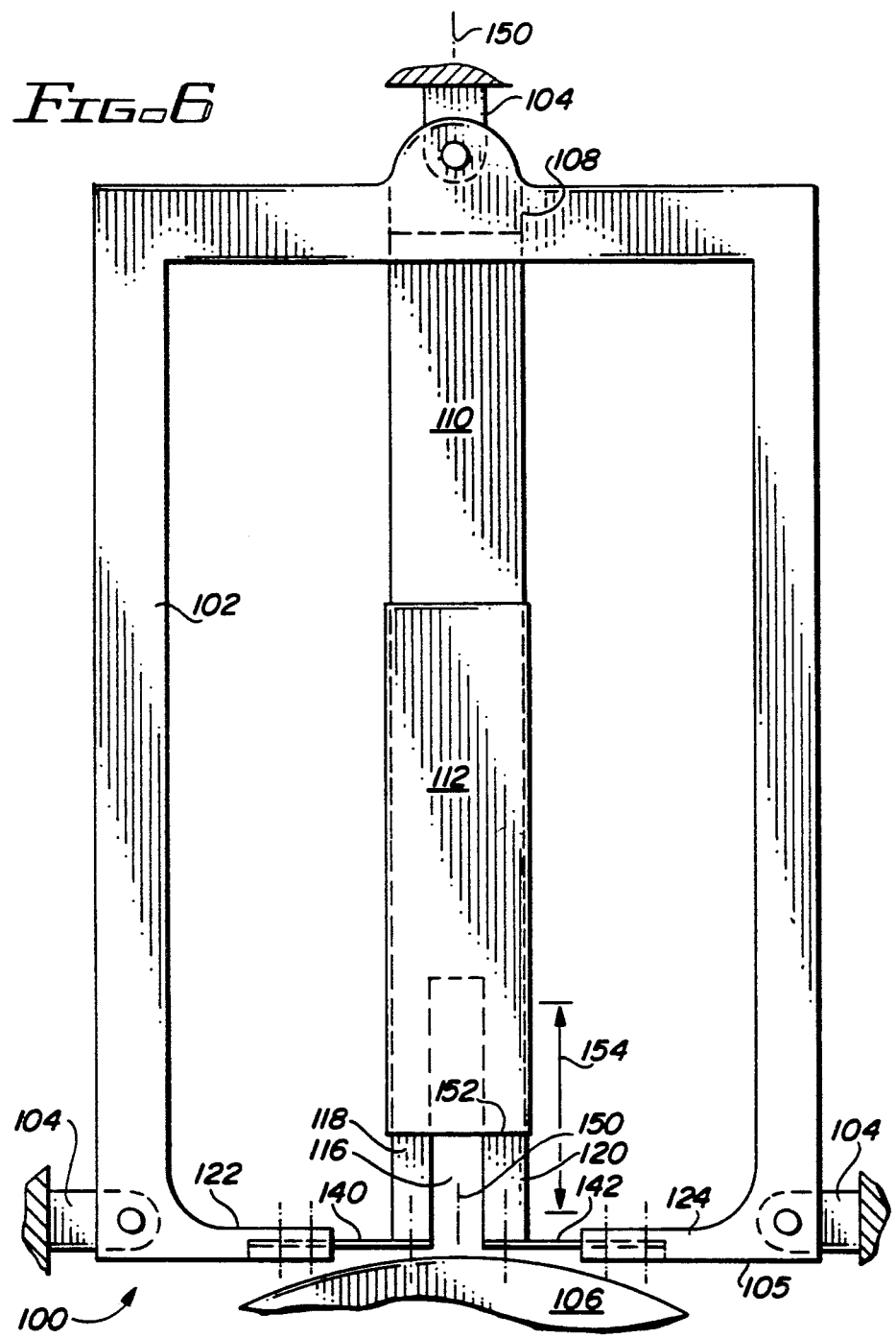
FIG. 6 is a top view of a first embodiment of the actuator of the present invention.

FIG. 1 shows a perspective view of a portion of the actuator assembly of the present invention and is designated by the general reference number 10. In the embodiment shown a stator 12 may be rectangular in shape and has a slotted section 14 at one end. Stator 12 is made of a ceramic, composite or metallic material. Stator 12 has a plurality of orifices 16 around its outer surfaces. Passages provide a flow of a suitable gas such as air through the orifices 16 such that the outer surfaces of stator 12 are air bearing surfaces.

A slider 20 is rectangular in shape and is sized to fit over stator 12 such that a small gap of approximately 500 microinches exists between the slider 20 and the air bearing surfaces of stator 12. Slider 20 is shown with a cut away section 22 so that the slotted section 14 and orifices 16 may be viewed.

Slider 20 is preferably made of glass by a vacuum shrinking process. The slider 20 is vacuum shrunk onto a precision mandrel. The result is that the slider 20 is sized to fit exactly over the stator 12 leaving only the minimum gap necessary for the air bearing. The vacuum shrinking process allows for manufacture of a precision part at a low cost.

A transducer arm assembly 30 is fastened to the end of slider 20. Assembly 30 comprises a plurality of stacked transducer arms 32, each having a corresponding transducer 34. The transducer arm assembly 30 is sized to fit within slotted section 14. The arms 32 may slide between a stack of data storage disks. The outline of a bottom disk 40 of the disk stack is shown.

FIG. 2 shows a top view of the stator 12 and slider 20 of FIG. 1. Stator 12 has three orifices 16 on the top surface as well as three corresponding orifices 16 (not shown) on the bottom surface. Slider 20 has a plurality of air chambers 50 on its inner surface. Each chamber 50 corresponds to and is positioned over one of the orifices 16. The chambers 50 are shaped such that a portion of the chamber 50 will be over an orifice 16 for any position of the slider 20 during its range of motion. The range of an end 52 of slider 20 is shown by an arrow 54.

FIG. 3 shows a side view of the stator 12 and the slider 20. Each side of stator 12 has a pair of orifices 16. Slider 20 has a pair of corresponding chambers 50 on each side.

FIG. 4 is a cross-sectional view of the stator 12 and slider 20 of FIGS. 2 and 3. Stator 12 has a couple of central passages 60 which provide air to branching passages 62 and in turn provide air to orifices 16. The air empties into chambers 50 of slider 20. The result is that air bearing surfaces are formed around the outer surfaces of stator 12. The corners of stator 12 are chamfered to provide exhaust air slots 70. Slots 70 are sized such that during operation, the air pressure within slots 70 is approximately atmospheric. This insures a uniform pressure drop along the edges of chambers 50.

FIG. 5 shows a different cross-sectional view of the stator 12 and slider 20 of FIGS. 2 and 3 which shows the arrangement of passages 60 and 62 and orifices 16.

Figure 7:
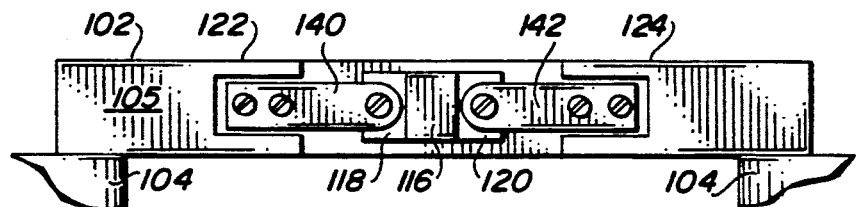
FIG. 7 is an end view of the actuator of FIG. 6.

FIGS. 6 and 7 show a top and end view, respectively, of a first embodiment of an actuator assembly and is designated by the general reference number 100. A stator frame 102 is securely mounted in a disk drive system by three bosses 104. Frame 102 is rectangular in shape. An end 105 of frame 102 is located proximate the outer edge of a disk stack 106. Frame 102 may be made of aluminum. Frame 102 has a passage 108 shaped to receive a first end of a stator 110. Stator 110 is rigidly attached to frame 102 within passage 108 by epoxy bonding, clamp fitting or other suitable means. A slider 112 is positioned over the stator 110. Stator 110 and slider 112 are similar to stator 12 and slider 20 of FIG. 1. Stator 110 has a slotted section 116 for receiving a transducer arm assembly (not shown) similar to assembly 30 of FIG. 1.

Slotted section 116 divides stator 110 into a first arm section 118 and a second arm section 120. Frame 102 has a first extension section 122 which extends in a direction tangential to the outer edge of disk stack 106. A second extension section 124 extends in a direction opposite to extension 122 and tangential to the outer edge of disk stack 106. A first strap 140 is attached between extension 122 and an end of arm 118. A second strap 142 is attached between extension 124 and an end of arm 120. Straps 140 and 142 are made of stainless steel. The thickness and length of straps 140 and 142 is such that they can flex to accommodate the differences in the thermal expansion of the stator 110 and frame 102 in a direction along an axis 150 of stator 110. An end 152 of slider 112 moves within a range shown by arrow 154.

FIGS. 8 and 9 show a top and end view, respectively, of a second embodiment of an actuator assembly which is designated by the general reference number 200. A stator frame 202 is securely mounted in a disk drive system by three bosses 204. Frame 202 is rectangular in shape. An end 205 of frame 202 is located proximate the outer edge of a disk stack 206. Frame 202 may be made of aluminum. Frame 202 has a passage 208 sized to receive an end of stator 210. Frame 202 has a pin member 214 which extends into passage 208. Stator 210 has a conical aperture 216 which receives pin 214. Portions of frame 202 and stator 210 are shown cut away to more clearly view pin 214 and aperture 216.

A slider 220 is positioned over the stator 210. Stator 210 and slider 220 are similar to stator 12 and slider 20, respectively, of FIG. 1.

Stator 210 has a slotted section 222 for receiving a transducer arm assembly (not shown) similar to assembly 30 of FIG. 1. Slotted section 222 divides stator 210 into a first arm section 230 and a second arm section 232. Frame 202 has a first extension section 240 which extends in a direction tangential to the outer edge of disk stack 206. A second extension section 242 extends in a direction opposite to extension section 240 and tangential to the outer edge of disk stack 206.

A first connector 250 connects arm 230 to extension 240. Connector 250 comprises a stainless steel strap 252 which is bent in two places. A first section 254 lies flat along the top of extension 240. A clamping piece 256 clamps section 254 to extension 240 by a plurality of screws. A second section 260 of strap 252 is bent downward at a 90° angle to section 254 at an edge 261 of extension 240. A third section 262 of strap 252 is bent sideways at a 90° angle to section 260 at an edge 263. Section 262 is attached to arm 230 by means of a spacer 270. Extension 240 has a slanted end surface 272 such that edge 261 forms an acute angle. The connector 250 allows stator 210 to move laterally relative to frame 202 by bending along edge 261. Connector 250 also allows stator 210 to move axially relative to frame 202 along an axis 274 by bending along edge 263.

A second connector 280 connects arm 232 to extension 242. Connector 280 comprises a stainless steel strap 282 attached to extension 242 at a first end. A second end of strap 282 has a stainless steel ball bearing 284 welded to it. Arm 232 has a conical aperture 290 which receives ball 284. A portion of arm 232 is shown cut away in order to view aperture 284. Connector 280 and pin 214 allow stator 210 to rotate along axis 274 relative to frame 202. Strap 282 is able to bend to accommodate axial movement of stator 210 along axis 274 relative to frame 202. An arrow 294 represent the range of movement of an end 296 of slider 220.

Although stator 12 was shown in FIG. 1 as having a rectangular cross-section, stator 12 may have other suitable shapes.

FIG. 10 shows a perspective view of an alternative embodiment of a stator 300 of the present invention. Stator 300 is similar to stator 12 of FIG. 1 except that it has a hexagonal cross-section.

FIG. 11 shows a perspective view of another alternative embodiment of a stator 400 of the present invention. Stator 400 is similar to stator 12 of FIG. 1 except that it has a nonrectangular parallelogram cross-section.

FIG. 12 shows a perspective view of a further alternative embodiment of a stator 500 of the present invention. Stator 500 is similar to stator 12 of FIG. 1 except that it has a square cross-section. A slotted section 502 runs form corner to corner in a vertical direction. The present invention may have a variety of other stator shapes.

The operation of the present invention may now be understood. Turning now to FIG. 1-5. The passages 60 of stator 12 are connected to a compressed source of a suitable gas such as air such that an air pressure of approximately 2 psi is achieved in each of chambers 50 of slider 20. Although 2 psi is the pressure used in the preferred embodiment, other pressures may be used. The pressure preferably is just sufficient to provide an air bearing between slider 20 and stator 12. Lower pressures are beneficial for two reasons. One, the lower pressure requires a less costly compressed air source. Two, the lower pressure provides a damping effect which gives the slider 20 a smooth ride over stator 112. Higher pressures have been found to increase the stiffness of the system while lowering the damping effect.

The air chambers 50 and hence, the air bearing move with the slider 20 as it moves along stator 12. From the point of view of the slider 12, the supporting forces are always in the same location no matter what the position of the slider 12. This consistency further helps to provide a smooth travel motion. In contrast, without chambers 50, the slider 20 would experience a change in location of its supporting forces every time it moved (i.e. the orifices 16 will be in a different position relative to slider 20) and this would add unwanted lateral shifts in the location of the slider 20.

The slotted section 14 of stator 12 allows the transducer arm assembly 30 to be contained within stator 12 when it is fully retracted. This provides a very compact actuator arrangement. It also allows the stator 12 to extend right up to the outer diameter edge of the disk stack. This results in the slider 20 and arm assembly 30 having excellent support. The support is provided without the necessity of extending the stator between the disks which would entail greater clearances between the disks and a resulting decrease in the number of disks per stack.

The use of a glass slider 20 provides further advantages. The glass is relatively light weight and this allows increases the speed of the actuator. In addition, the use of glass allows the slider to be manufactured by the vacuum shrink process. This process enables a high precision part to be manufactured at a relatively low cost.

Turning now to FIGS. 6 and 7. During operation, the internal temperature of the disk drive may vary from room temperature to 140° Fahrenheit or more. This may cause the frame 102 to expand in an axial direction relative to stator 110. If this happens, straps 140 and 142 will flex and accommodate the axial expansion. By accommodating this axial movement of stator 110, distortion of the stator 110 is prevented. This is extremely important because the air bearing requires a gap to be maintained between stator 110 and slider 112 of approximately 500 microinches. Even a slight deflection of arms 118 or 120 will cause the slider 112 to bind.

Turning now to FIGS. 8 and 9. Frame 202 may move laterally relative to stator 210. Connector 250 allow this lateral movement to occur without distortion of stator 210. Connector 250 can bend along edge 261 to absorb the lateral movement. Connector 250 also accommodates axial movement by bending along edge 263 and flexing strap 282.

Frame 202 may experience slight axial rotation relative to stator 210. Connector 280 has a ball and socket type of connection which along with pin 214 will allow for this rotational movement.

While the invention has been shown and described with reference to preferred embodiments thereof, it will be understood by those skilled the art that there are changes in form and detail which may be made without departing from the spirit and scope of the invention. Accordingly, the invention is not to be deemed limited except as specified in the claims.

What is claimed is:

1. An actuator system comprising:
    a stator having a gas bearing outer surface, a first end of the stator for positioning proximate a data storage disk, the first end having a slotted section;
    a slider sized to fit around the outer surface of the stator for linear movement along said gas bearing outer surface; and
    a transducer arm assembly attached to said slider and sized to fit within the slotted section such that the transducer arm assembly is positioned within the slotted section when the slider is fully retracted.

2. The system of claim 1, wherein the stator has a plurality of orifices on said gas bearing outer surface for delivering gas to said gas bearing outer surface, and the slider has a chamber corresponding to each of said orifices, such that said gas from said orifices fills said chambers for any position of the slider and the slider is supported by the gas in the chambers.

3. The system of claim 2, wherein the gas is air and pressure in the chambers is approximately 2 psi.

4. The system of claim 1, further comprising a stator frame having attachment means for mounting the stator without interfering with the movement of the slider.

5. The system of claim 4, wherein the attachment means allows the frame and stator to rotate relative to one another.

6. The system of claim 4, wherein the attachment means allows the frame and stator to move axially relative to one another.

7. The system of claim 4, wherein the attachment means allows the frame and stator to move laterally relative to one another.

8. The system of claim 1, wherein the slider is made of glass in a vacuum shrinking process.

9. A data storage disk drive system comprising:
    a data storage disk containing at least one surface for storing information;
    an actuator assembly for positioning a transducer arm assembly relative to the disk, said actuator assembly comprising a stator having a gas bearing outer surface, a first end of the stator for positioning proximate the data storage disk, the first end having a slotted section, a slider sized to fit around the outer surface of the stator for linear movement along said gas bearing outer surface, and a transducer arm assembly attached to said slider and sized to fit within the slotted section such that the transducer arm assembly is positioned within the slotted section when the slider is fully retracted.

10. The system of claim 9, wherein the stator has a plurality of orifices on said gas bearing outer surface for delivering gas to said gas bearing outer surface, and the slider has a chamber corresponding to each of said orifices, such that said gas from said orifices fills said chambers for any position of the slider and the slider is supported by the gas in the chambers.

11. The system of claim 10, wherein the gas is air and pressure in the chambers is approximately 2 psi.

12. The system of claim 9, further comprising a stator frame having attachment means for mounting the stator without interfering with the movement of the slider.

13. The system of claim 12, wherein the attachment means allows the frame and the stator to rotate axially relative to one another.

14. The system of claim 12, wherein the attachment means allows the frame and stator to move axially relative to one another.

15. The system of claim 12, wherein the attachment means allows the frame and stator to move laterally relative to one another.

16. The system of claim 9, wherein the slider is made of glass in a vacuum shrinking process.

17. An actuator system comprising:
    a stator having a gas bearing outer surface and having a predetermined cross-section, a first end of the stator for positioning proximate a data storage disk, the first end having a slotted section;
    a slider sized to fit around the outer surface of the stator for linear movement along the gas bearing outer surface, the slider having a shape complimentary to the predetermined cross-section such that a small predetermined spacing is produced between the slider and the gas bearing outer surface of the stator; and
    a transducer arm assembly attached to said slider and sized to fit within the slotted section such that the transducer arm assembly is positioned within the slotted section when the slider is fully retracted.

18. The system of claim 17, wherein the predetermined cross-section is rectangular in shape.

19. The system of claim 17, wherein the predetermined cross-section is hexagonal in shape.

20. The system of claim 17, wherein the predetermined cross-section is a parallelogram in shape.

21. The system of claim 17, wherein the predetermined cross-section is a square in shape.

22. The system of claim 17, wherein the stator has a plurality of orifices on said gas bearing outer surface for delivering gas to said gas bearing outer surface, the slider has a chamber corresponding to each of said orifices, such that said gas from said orifices fills said chambers for any position of the slider and the slider is supported by the gas in the chambers.

23. The system of claim 22, wherein the gas is air and pressure in the chambers is approximately 2 psi.

24. The system of claim 22, wherein the gas bearing outer surface further includes exhaust slots for discharging gas from the gas bearing outer surface such that there is a uniform pressure drop along edges of the chambers.

25. The system of claim 22, further comprising a stator frame having attachment means for mounting the stator at the first end and a second end without interfering with the movement of the slider.

26. The system of claim 25, wherein the slotted section separates first and second arm sections of the stator and the attachment means comprises a first flexible strap connecting the first arm section to the frame and a second flexible strap connecting the second arm section to the frame.

27. The system of claim 25, wherein the slotted section separates first and second arm sections of the stator and the attachment means comprises a first flexible strap bent along two edges and connecting the first arm section to the frame, and a second flexible strap connected to the frame and having a ball member for reception in an aperture in the second arm section, and a pin member extending from the frame for reception in an aperture in the second end of the stator.

* * * * *